US012658420B2

(12) United States Patent
Ose et al.

(10) Patent No.: US 12,658,420 B2
(45) Date of Patent: Jun. 16, 2026

(54) ELECTRODE PRODUCTION METHOD AND SOLID-STATE BATTERY PRODUCTION METHOD

(71) Applicants: TOYOTA JIDOSHA KABUSHIKI KAISHA, Toyota (JP); Panasonic Holdings Corporation, Kadoma (JP)

(72) Inventors: Norihiro Ose, Nagoya (JP); Kazuki Muraishi, Toyota (JP); Hiroki Yabe, Hirakata (JP); Izuru Sasaki, Kyoto (JP); Hiroki Kamitake, Osaka (JP)

(73) Assignees: TOYOTA JIDOSHA KABUSHIKI KAISHA, Toyota (JP); PANASONIC HOLDINGS CORPORATION, Kadoma (JP)

( * ) Notice: Subject to any disclaimer, the term of this patent is extended or adjusted under 35 U.S.C. 154(b) by 517 days.

(21) Appl. No.: 18/210,754

(22) Filed: Jun. 16, 2023

(65) Prior Publication Data

US 2024/0006577 A1 Jan. 4, 2024

(30) Foreign Application Priority Data

Jun. 30, 2022 (JP) ................................ 2022-105794

(51) Int. Cl.
*H01M 10/0562* (2010.01)
*H01M 4/04* (2006.01)

(52) U.S. Cl.
CPC ..... *H01M 4/0416* (2013.01); *H01M 10/0562* (2013.01); *H01M 2300/0068* (2013.01)

(58) Field of Classification Search
None
See application file for complete search history.

(56) References Cited

U.S. PATENT DOCUMENTS

| | | | | |
|---|---|---|---|---|
| 2015/0096169 | A1 * | 4/2015 | Hasegawa ............ | H01M 4/139 427/126.3 |
| 2020/0106088 | A1 | 4/2020 | Ito et al. | |
| 2021/0305627 | A1 * | 9/2021 | Tsutsui .............. | H01M 10/0585 |
| 2022/0263112 | A1 | 8/2022 | Matsuo et al. | |

FOREIGN PATENT DOCUMENTS

| | | | | |
|---|---|---|---|---|
| JP | 2014-154406 A | | 8/2014 | |
| JP | 2020-053307 A | | 4/2020 | |
| WO | WO-2020136975 A1 | * | 7/2020 | ........ H01M 10/0525 |
| WO | 2020/241322 A1 | | 12/2020 | |

* cited by examiner

*Primary Examiner* — Carlos Barcena
(74) *Attorney, Agent, or Firm* — Dinsmore & Shohl LLP

(57) ABSTRACT

An active material, a solid electrolyte, and a solvent are hard-kneaded to prepare a first electrode material. A dispersion promotion component is added to the first electrode material to prepare a second electrode material. Slurry containing the second electrode material is prepared. An electrode is produced by applying the slurry to a surface of a base material. A composite body is formed by the solid electrolyte adhering to a surface of the active material. The dispersion promotion component promotes dispersion of the solid electrolyte in the solvent.

7 Claims, 2 Drawing Sheets

ELECTRODE PRODUCTION METHOD AND SOLID-STATE BATTERY PRODUCTION METHOD

CROSS-REFERENCE TO RELATED APPLICATION

This application claims priority to Japanese Patent Application No. 2022-105794 filed on Jun. 30, 2022, incorporated herein by reference in its entirety.

BACKGROUND

1. Technical Field

The present disclosure relates an electrode production method and a solid-state battery production method.

2. Description of Related Art

Japanese Unexamined Patent Application Publication No. 2020-053307 (JP 2020-053307 A) discloses fabricating paste by adding a solvent to a hard-kneaded electrode material.

SUMMARY

Bulk-type solid-state batteries have been considered. A bulk-type solid-state battery may be produced by stacking powder layers. A wet process is desirable as a method of forming the powder layers. In the wet process, slurry containing an active material, a solid electrolyte, etc. is prepared. The powder layers (electrode) may be produced by applying the slurry to the surface of a base material.

For mass production, it is occasionally necessary to temporarily store electrodes in progress. For example, it is conceivable to store the slurry. However, the slurry contains a large amount of liquid, and therefore tends to have a short pot life. That is, the solid content of the slurry may settle down in a relatively short time. It is difficult to reproduce the slurry once the settled solid content is cured.

Normally, the slurry may be produced through hard-kneading and dilution. The term “hard-kneading” refers to an operation of kneading and mixing hard fluids like solids. In the hard-kneading, materials with high solid contents are mixed. In the hard-kneading, a large shearing force may be generated to deagglomerate the powder. When the powder is deagglomerated, it is expected that different kinds of powder are dispersed well to be mixed with each other.

Hereinafter, products in progress after the hard-kneading will also be referred to as a “hard-kneaded material”. The slurry may be formed by diluting the hard-kneaded material with a solvent (liquid) and stirring the material. It is also conceivable to store the hard-kneaded material, for example. The hard-kneaded material tends to have a long pot life compared to the slurry. The hard-kneading takes a large number of man-hours. It is expected to improve productivity by preparing and storing a large amount of the hard-kneaded material and producing slurry by diluting the hard-kneaded material as necessary.

In the hard-kneaded material, a liquid is retained between solid particles. As the time passes during storage, the liquid may seep to cause the solid particles to be strongly bonded to each other. That is, the solid and the liquid may be separated. It is difficult to form homogeneous slurry in a short time once the solid and the liquid are separated.

An object of the present disclosure is to improve productivity.

Technical configurations and functions and effects of the present disclosure will be described below. However, the action mechanism described herein includes estimation. The action mechanism does not limit the technical scope of the present disclosure.

1. An electrode production method includes the following (a) to (d):

(a) hard-kneading an active material, a solid electrolyte, and a solvent to prepare a first electrode material;

(b) adding a dispersion promotion component to the first electrode material to prepare a second electrode material;

(c) preparing slurry containing the second electrode material; and (d) producing an electrode by applying the slurry to a surface of a base material. A composite body is formed by the solid electrolyte adhering to a surface of the active material in the (a). The dispersion promotion component promotes dispersion of the solid electrolyte in the solvent.

The first electrode material and the second electrode material are each a product in progress after being hard-kneaded. That is, the first electrode material and the second electrode material are each a hard-kneaded material.

According to the new findings of the present disclosure, formation of slurry after storage may be facilitated by adding a specific component to the hard-kneaded material. That is, a dispersion promotion component is added to the hard-kneaded material. The dispersion promotion component may promote dispersion of the solid electrolyte in the solvent. The solid electrolyte and the active material form a composite body. It is expected that the action of the dispersion promotion component promotes dispersion of the composite body to form homogeneous slurry in a short time.

2. In the electrode production method according to “1” above, the (b) may include storing the second electrode material.

The second electrode material, to which the dispersion promotion component has been added, is suitable for storage. This is because slurry can be formed easily even after storage.

3. In the electrode production method according to “1” or “2” above, the solid electrolyte may contain a sulfide solid electrolyte, for example. The dispersion promotion component may contain a styrene-butadiene rubber-based binder, for example.

Hereinafter, the “solid electrolyte” may be abbreviated as “SE”. For example, the sulfide solid electrolyte may be abbreviated as “sulfide SE”. The sulfide SE has both a high ion conductivity and a good formability. The sulfide SE is suitable for bulk-type solid-state batteries. The styrene-butadiene rubber (SBR)-based binder may promote dispersion of the sulfide SE.

4. In the electrode production method according to any one of “1” to “3” above, the solid electrolyte may contain a sulfide solid electrolyte, for example. The dispersion promotion component may contain an imidazoline compound, for example.

The imidazoline compound may act as a dispersant for the solid content of the slurry. The imidazoline compound may impart a good dispersibility to the sulfide SE, in particular.

5. In the electrode production method according to any one of “1” to “4” above, the solid electrolyte may contain a sulfide solid electrolyte, for example. The solvent may contain tetralin, for example.

Tetralin is also written as tetrahydronaphthalene (1,2,3,4-tetrahydronaphthalene: THN). THN tends not to degrade the sulfide SE. Further, THN may have a high viscosity. The solid and the liquid are not easily separated during storage when the solvent contains THN.

6. A solid-state battery production method includes the following (e): (e) producing a solid-state battery including the electrode according to any one of "1" to "5" above.

An embodiment of the present disclosure (which may be hereinafter referred to simply as "present embodiment") and examples of the present disclosure (which may be hereinafter referred to simply as "examples") will be described below. The present embodiment and the examples do not limit the technical scope of the present disclosure. The present embodiment and the examples are exemplary in all respects. The present embodiment and the examples are not limiting. The technical scope of the present disclosure includes all modifications that fall within the meaning and scope equivalent to the claims. For example, it is planned from the beginning to extract desired configurations from the present embodiment and the examples and combine the extracted configurations as desired.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Terms, Definitions Thereof, Etc

Figure 1:
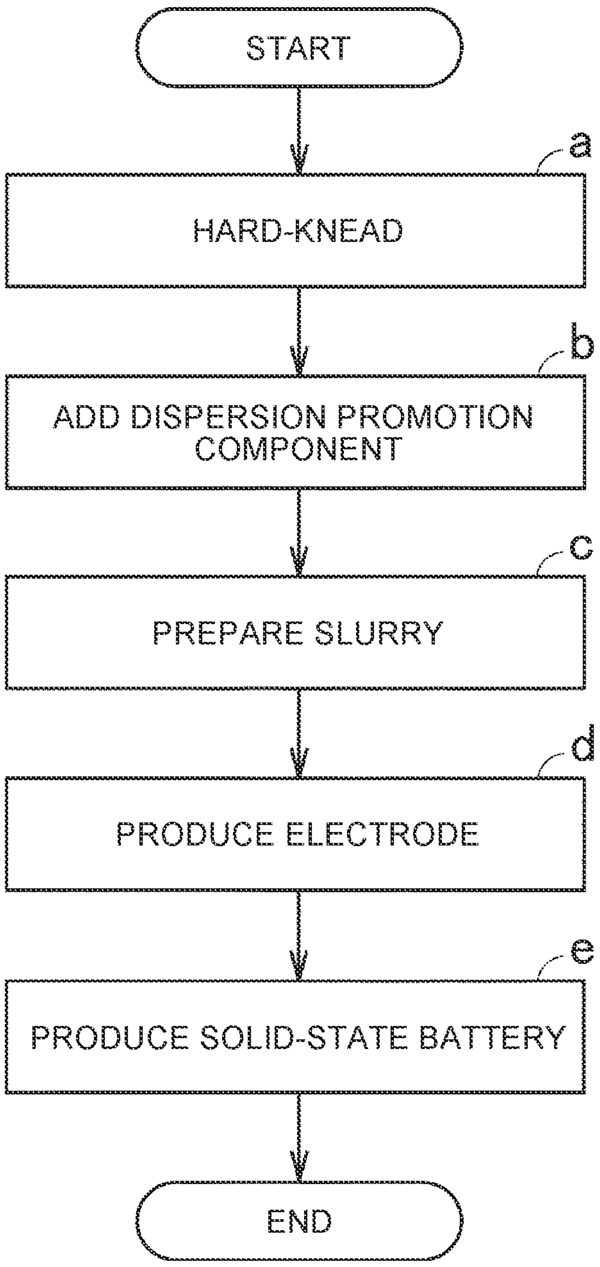
FIG. 1 is a schematic flowchart of a production method according to the present embodiment.

The terms "comprise," "include," "have," and variations thereof (e.g., "composed of" and so forth) are open-ended. When any of the open-ended terms is used, it means that additional elements may or may not be included. The term "consist of" is closed-ended. Even when a closed-ended term is used, this does not mean that additional elements such as normally accompanying impurities and elements irrelevant to the technique of the present disclosure are excluded. The term "substantially consist of" is semi-closed-ended. When a semi-closed-ended term is used, this means that it is allowed to add elements that do not substantially affect the basic and novel characteristics of the technique of the present disclosure.

"Either or both of A and B" includes "A or B" and "A and B." "Either or both of A and B" can also be written as "A and/or B."

The words such as "may" and "can" are used in a permissive sense, meaning that "it is possible," rather than in a mandatory sense, meaning "must."

The order in which a plurality of steps, actions, operations, etc. included in various methods is performed is not limited to the order described herein unless otherwise specified. For example, a plurality of steps may proceed in parallel. For example, the order of a plurality of steps may be reversed.

Elements in a singular form can also be plural unless otherwise specified. For example, the term "particle" can mean not only "one particle" but also an "agglomerate of particles (powder, powdery material, or group of particles)."

Numerical ranges such as "m % to n %" and so forth, for example, are inclusive ranges including upper limit values and lower limit values thereof. That is, "m % to n %" indicates the numerical range of "m % or more and n % or less". Further, "m % or greater and n % or less" includes "greater than m % and less than n %." A numerical value optionally selected from within the numerical range may be set to a new upper limit value or a new lower limit value. For example, a new numerical range may be set by optionally combining a numerical value in the numerical range and a numerical value shown in a different part of the present specification, tables, drawings, etc.

All numerical values should be interpreted as being modified by the term "about". The term "about" can mean, for example, ±5%, ±3%, ±1%, and so forth. All numerical values can be approximate values that can change depending on the way in which the technique of the present disclosure is used. All numerical values can be expressed in significant figures. A measured value can be an average of a plurality of measurements. The number of measurements may be three or more, five or more, or 10 or more. Typically, the larger the number of measurements is, the higher the reliability of the average is expected to be. A measured value can be rounded off based on the number of places of significant figures. A measured value can include variation or the like that is associated with, for example, the detection limit of a measuring device, or the like.

When a compound is represented by a stoichiometric composition formula (e.g., "$LiCoO_2$" or the like), the stoichiometric composition formula is merely a representative example of the compound. The compound may have a non-stoichiometric composition. For example, when lithium cobalt oxide is represented by "$LiCoO_2$," lithium cobalt oxide is not limited to the composition ratio of "Li:Co:O=1:1:2" and can contain lithium (Li), cobalt (Co), and oxygen (O) in any composition ratio, unless otherwise specified. Moreover, doping with a trace element, substitution with a trace element, and so forth, can be allowed.

"Semimetals" include B, Si, Ge, As, Sb, and Te. "Metals" indicate elements other than "H, B, Si, Ge, As, Sb, Te, C, N, P, O, S, and Se", among elements of groups 1 to 16 of the periodic table. When an inorganic compound includes at least one of a semimetal and a metal and F, the semimetal and the metal may have a positive (+) oxidation number.

The term "electrode" collectively refers to a positive electrode and a negative electrode. The electrode may be a positive electrode or a negative electrode.

The term "hollow particles" refers to particles, the central cavity of which has an area that is 30% or more of the cross-sectional area of the entire particle in cross-sectional images (e.g. cross-sectional SEM images etc.) of the particles. The term "solid particles" refers to particles, the central cavity of which has an area that is less than 30% of the entire particle in cross-sectional images of the particles.

"D50" indicates a particle size at which the cumulative frequency in the order from the smallest particle size reaches 50% in the volume-based particle size distribution. D50 can be measured by a laser diffraction particle size distribution measuring device.

The "average Feret diameter" is measured in two-dimensional images (e.g. SEM images etc.) of the particles. The "average Feret diameter" is obtained as the arithmetic average of the maximum Feret diameters of 20 or more particles.

The "solid content concentration" indicates the proportion of the total mass of components other than the solvent to the mass of the entire mixture. The solid content concentration is given in percentage.

Production Method

FIG. 1 is a schematic flowchart of a production method according to the present embodiment. Hereinafter, the "production method according to the present embodiment" may be referred to simply as "present production method". The present production method includes an "electrode production method" and a "solid-state battery production method". The electrode production method includes "(a) hard-kneading", "(b) adding a dispersion promotion component", "(c) preparing slurry", and "(d) producing an electrode". The solid-state battery production method further includes "(e) producing a solid-state battery" in addition to (a) to (d).

(a) Hard-Kneading

The present production method includes hard-kneading a mixture of an active material, a solid electrolyte, and a solvent to prepare a first electrode material.

The hard-kneading may be performed using any mixing device. For example, a planetary centrifugal mixer, a kneader, etc. may be used. These devices may be suitable for kneading operations. For example, in the kneader etc., contents are kneaded in gaps between the inner wall of a mixing container and blades while applying a compressive force and a shearing force to the contents. For example, a planetary mixer etc. may be used.

For example, predetermined composition amounts of the active material and the SE are supplied to the mixing device. Further, the solvent is added so as to achieve a predetermined solid content concentration. The solid content concentration in the hard-kneading may be 72% or more, for example. When the solid content concentration is 72% or more, the solvent is easily retained inside the powder, which tends to facilitate the hard-kneading. The solid content concentration may be 74% or more, 75.5% or more, 76% or more, or 78% or more, for example. When the solid content concentration is 76% or more, the solid and the liquid are not easily separated during mixing, which tends to stabilize the hard-kneading. The solid content concentration in the hard-kneading may be 90% or less, for example. When the solid content concentration is 90% or less, the mixture is easily uniformly moistened, which tends to stabilize the hard-kneading. The solid content concentration may be 88% or less, 85% or less, 83% or less, or 82% or less, for example. The solid content concentration may be 76% to 83%, for example. The dispersion tends to be promoted when the solid content concentration is in such a range. It is expected that an output is improved etc. when the dispersion is promoted, for example.

The hard-kneading may be performed such that the active material and the SE are uniformly mixed. The processing time of the hard-kneading may be 0.5 hours or more, 1 hour or more, 2 hours or more, or 3 hours or more, for example. The processing time of the hard-kneading may be 8 hours or less or 4 hours or less, for example. When the hard-kneading is not stabilized, the solid and the liquid are separated during the processing, and therefore a sufficient processing time may not be secured, for example. When the processing time is not sufficient, uniform dispersion may not be achieved.

A first electrode material is formed through the hard-kneading. The first electrode material is moist. The first electrode material may be granular, powdery, clayey, etc., for example. The first electrode material contains a composite body.

Composite Body

The composite body is formed by the SE adhering to the surface of the active material. For example, the active material may be covered with the SE. The SE may cover a part of the surface of the active material, for example. The SE may cover the entire surface of the active material, for example.

Active Material

The active material is particulate. The active material may be secondary particles, for example. The secondary particles are aggregates of primary particles. The D50 of the secondary particles may be 1 to 30 μm, 3 to 20 μm, or 5 to 15 μm, for example. The average Feret diameter of the primary particles may be 0.01 to 3 μm, for example.

The active material can have any shape. The active material may be spherical, ellipsoidal, flaky, fibrous, etc., for example. The active material may be solid particles or hollow particles.

The active material can cause an electrode reaction. The active material may be a positive electrode active material, for example. The positive electrode active material can contain any component. The positive electrode active material may contain at least one kind selected from the group consisting of $LiCoO_2$, $LiNiO_2$, $LiMnO_2$, $LiMn_2O_4$, $Li(NiCoMn)O_2$, $Li(NiCoAl)O_2$, $Li(NiCoMnAl)O_2$, and $LiFePO_4$, for example. For example, "(NiCoMn)" in "$Li(NiCoMn)O_2$" indicates that the total of the composition ratios of the elements in the parentheses is 1. The amounts of the individual components may be determined as desired as long as the total is 1. $Li(NiCoMn)O_2$ may contain at least one kind selected from the group consisting of $LiNi_{1/3}Co_{1/3}Mn_{1/3}O_2$, $LiNi_{0.4}Co_{0.3}Mn_{0.3}O_2$, $LiNi_{0.5}Co_{0.2}Mn_{0.3}O_2$, $LiNi_{0.5}Co_{0.3}Mn_{0.2}O_2$, $LiNi_{0.5}Co_{0.4}Mn_{0.1}O_2$, $LiNi_{0.5}Co_{0.1}Mn_{0.4}O_2$, $LiNi_{0.6}Co_{0.2}Mn_{0.2}O_2$, $LiNi_{0.6}Co_{0.3}Mn_{0.1}O_2$, $LiNi_{0.6}Co_{0.1}Mn_{0.3}O_2$, $LiNi_{0.7}Co_{0.1}Mn_{0.2}O_2$, $LiNi_{0.7}Co_{0.2}Mn_{0.1}O_2$, $LiNi_{0.8}Co_{0.1}Mn_{0.1}O_2$, and $LiNi_{0.9}Co_{0.05}Mn_{0.05}O_2$, for example. $Li(NiCoAl)O_2$ may contain $LiNi_{0.8}Co_{0.15}Al_{0.05}O_2$ etc., for example.

The positive electrode active material may be represented by the following formula (1), for example.

$$Li_{1-y}Ni_xM_{1-x}O_2 \quad (1)$$

$$0.5 \le x \le 1$$

$$-0.5 \le y \le 0.5$$

In the above formula (1), M may contain at least one kind selected from the group consisting of Co, Mn, and Al, for example. x may be 0.6 or more, 0.7 or more, 0.8 or more, or 0.9 or more, for example.

The positive electrode active material may contain an additive, for example. The additive may be substitutional solute atoms or interstitial solute atoms, for example. The additive may be attached matter attached to the surface of the positive electrode active material (primary particles). The attached matter may be an element, an oxide, a carbide, a nitride, a halide, etc., for example. The amount of the additive may be 0.01 to 0.1, 0.02 to or 0.04 to 0.06, for example. The amount of the additive is indicated in the ratio of the amount of substance of the additive to the amount of substance of the positive electrode active material [unit: mol]. The additive may contain at least one kind selected from the group consisting of B, C, N, halogen, Sc, Ti, V, Cu, Zn, Ga, Ge, Se, Sr, Y, Zr, Nb, Mo, In, Sn, W, and lanthanoid, for example.

The active material may be a negative electrode active material, for example. The negative electrode active material can contain any component. The negative electrode active material may contain at least one kind selected from the group consisting of natural graphite, artificial graphite, soft carbon, hard carbon, Si, $SiO_x$ (0<x<2), Si-based alloys, Sn, $SnO_x$ (0<x<2), Li, Li-based alloys, and $Li_4Ti_5O_{12}$, for example. $SiO_x$ (0<x<2) may be doped with Mg etc., for example. A composite material may be formed by an alloy-based active material (e.g. Si etc.) being carried by a carbon-based active material (e.g. graphite etc.).

Buffer Layer

A buffer layer may be formed on the surface of the active material. The buffer layer covers at least a part of the surface of the active material. The sulfide SE tends to be degraded when directly contacting the active material. The buffer layer may reduce direct contact between the active material and the sulfide SE. The buffer layer may have a thickness of 5 to 500 nm, for example. The buffer layer may be formed through a mechanochemical process, for example. Examples of a mechanochemical processing device include "Nobilta NOB-MINI" etc. manufactured by Hosokawa Micron Corporation, for example.

Oxide Solid Electrolyte

The buffer layer may contain an oxide SE, for example. The buffer layer may contain $LiNbO_3$, $Li_3PO_4$, etc., for example.

Fluoride Solid Electrolyte

The buffer layer may contain a fluoride SE, for example. The fluoride SE tends not to increase its reaction resistance during endurance compared to the oxide SE. The fluoride SE may have any composition as long as F is contained. The fluoride SE may contain Li and F, for example.

The fluoride SE may be represented by the following formula (2), for example.

$$Li_{6-nx}M_xF_6 \quad (2)$$

In the above formula (2), x meets 0<x<2. M is at least one kind selected from the group consisting of semimetal atoms and metal atoms other than Li. n indicates the oxidation number of M.

In the above formula (2), M may consist of a single atom, or may consist of a plurality of kinds of atoms. When M consists of a plurality of kinds of atoms, n indicates a weighted average of the oxidation numbers of the atoms. For example, when M contains Ti (oxidation number=+4) and Al (oxidation number=+3), the molar ratio of Ti and Al is "Ti/Al=3/7", and x=1 is met, n is calculated as 3.3 in accordance with the formula "n=0.3×4+0.7×3".

In the above formula (2), x may meet 0.1≤x≤1.9, 0.2≤x≤1.8, 0.3≤x≤1.7, 0.4≤x≤1.6, 0.5≤x≤1.5, 0.6≤x≤1.4, 0.7≤x≤1.3, 0.8≤x≤1.2, or 0.9≤x≤1.1, for example.

M may contain an atom having an oxidation number of +4, for example. M may contain an atom having an oxidation number of +3, for example. M may contain an atom having an oxidation number of +4 and an atom having an oxidation number of +3, for example.

In the above formula (2), M may contain at least one kind selected from the group consisting of Ca, Mg, Al, Y, Ti, and Zr, for example. M may contain at least one kind selected from the group consisting of Al, Y, and Ti, for example. M may contain at least one kind selected from the group consisting of Al and Ti, for example.

The fluoride SE may be represented by the following formula (3), for example.

$$Li_{3-x}Ti_xAl_{1-x}F_6 \quad (3)$$

In the above formula (3), x may meet 0≤x≤1, 0.1≤x≤0.9, 0.2≤x≤0.8, 0.3≤x≤0.7, or ≤x≤0.6, for example.

Solid Electrolyte

The SE is particulate. The SE may have a small D50 compared to the active material. The SE may have a D50 of 0.01 to 1 μm, 0.01 to 0.95 μm, or 0.1 to 0.9 μm, for example. The composition amount of the SE may be determined as desired. The composition amount of the SE may be 1 to 10 parts by mass, for example, with respect to 100 parts by mass of the active material. The SE may contain at least one kind selected from the group consisting of the sulfide SE, the fluoride SE, and the oxide SE, for example.

Sulfide Solid Electrolyte

The sulfide SE may exhibit a high ion conductivity. The sulfide SE may have any composition as long as S (sulfur) is contained. The sulfide SE may contain Li, P, and S, for example. The sulfide SE may further contain O, Ge, Si, etc., for example. The sulfide SE may further contain a halogen etc., for example. The sulfide SE may further contain I, Br, etc., for example. The sulfide SE may be of a glass-ceramic type or an argyrodite type, for example. The sulfide SE may contain at least one kind selected from the group consisting of LiI—LiBr—$Li_3PS_4$, $Li_2S$—$SiS_2$, LiI—$Li_2S$—$SiS_2$, LiI—$Li_2S$—$P_2S_5$, LiI—$Li_2O$—$Li_2S$—$P_2S_5$, LiI—$Li_2S$—$P_2O_5$, LiI—$Li_3PO_4$—$P_2S_5$, $Li_2S$—$GeS_2$—$P_2S_5$, $Li_2S$—$P_2S_5$, $Li_4P_2S_6$, $Li_7P_3S_{11}$, and $Li_3PS_4$, for example.

For example, "LiI—LiBr—$Li_3PS_4$" indicates a sulfide SE generated by mixing LiI, LiBr, and $Li_3PS_4$ at desired molar ratios. The sulfide SE may be generated through a mechanochemical process, for example. "$Li_2S$—$P_2S_5$" includes $Li_3PS_4$. $Li_3PS_4$ may be generated by mixing $Li_2S$ and $P_2S_5$ at "$Li_2S/P_2S_5$=75/25 (molar ratios)", for example. The molar ratios may be specified by providing numbers before LiI etc. For example, "10LiI-15LiBr-75$Li_3PS_4$" indicates that the components are mixed at "LiI/LiBr/$Li_3PS_4$=10/15/75 (molar ratios)".

Solvent

The solvent is a liquid. The solvent may promote adhesion between the active material and the sulfide SE during the hard-kneading. The solvent may function as a dispersion medium in the slurry. The solvent may contain any component. The solvent may contain at least one kind selected from the group consisting of aromatic hydrocarbons, esters, alcohols, ketones, and lactams, for example. The solvent may contain at least one kind selected from the group consisting of THN, butyl butyrate, heptane, and N-methyl-2-pyrrolidone (NMP), for example.

It is expected that butyl butyrate is less likely to degrade the sulfide SE than NMP etc., for example. It is expected that TI-IN is less likely to degrade the sulfide SE than butyl butyrate, NMP, etc., for example. It is expected that the initial resistance is reduced, for example, when the solvent contains THN.

Further, THN may have a high viscosity. It is expected that the solid and the liquid are not easily separated during storage when the solvent contains TI-IN.

(b) Addition of Dispersion Promotion Component

The present production method includes adding a dispersion promotion component to the first electrode material to prepare a second electrode material.

The second electrode material is formed by adding the dispersion promotion component to the first electrode material. The second electrode material may be lightly stirred after the second electrode material is formed. The second electrode material may be granular, powdery, clayey, liquid, etc., for example. The solid content concentration of the second electrode material may be 50% to 80%, 60% to 80%, 70% to 80%, 72% to 78.5%, or 75% to 78.5%, for example.

Dispersion Promotion Component

The dispersion promotion component may promote dispersion of the SE in the solvent. The dispersion promotion component may contain any component as long as the dispersion of the SE may be promoted. The dispersion promotion component may contain at least one kind selected from the group consisting of an imidazoline compound and an SBR-based binder, for example.

Imidazoline Compound

The dispersion promotion component may contain an imidazoline compound, for example. The imidazoline compound may impart a good dispersibility to the sulfide SE, in particular. The imidazoline compound has an imidazoline skeleton. The imidazoline skeleton includes a nitrogen-containing heterocyclic structure. The imidazoline skeleton may be derived from imidazole. The imidazoline compound may be represented by the following formula (4), for example.

[Chemical 1]

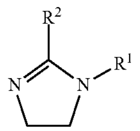

(4)

In the above formula (4), $R^1$ may be an alkyl group or a hydroxyalkyl group, for example. $R^1$ may have a carbon number of 1 to 22, for example. In the hydroxyalkyl group, a hydroxyl group may be bonded to a terminal carbon atom on the opposite side of a carbon atom bonded to N (nitrogen atom), for example.

In the above formula (4), $R^2$ may be an alkyl group or an alkenyl group, for example. $R^2$ may have a carbon number of 10 to 22, for example. In the alkenyl group, the positions and the number of double bonds may be determined as desired.

The imidazoline compound may contain 1-hydroxyethyl-2-alkenyl imidazoline etc., for example. The dispersion promotion component may contain one kind of imidazoline compound alone, or may contain two or more kinds of imidazoline compounds.

The composition amount of the imidazoline compound may be determined as desired. For example, the composition amount of the imidazoline compound may be 0.01 to 10 parts by mass, 0.05 to 5 parts by mass, or 0.05 to 0.1 parts by mass, with respect to 100 parts by mass of the active material.

SBR-Based Binder

The dispersion promotion component may contain an SBR-based binder. The SBR-based binder may impart dispersibility to the sulfide SE. The "SBR-based binder" indicates a binder containing an SBR-derived component. The SBR-based binder may consist of SBR. The SBR-based binder may be a copolymer of an SBR-derived component and other components. The SBR-based binder may be a polymer blend of an SBR-derived component and other components. The SBR-based binder may be a polymer alloy of an SBR-derived component and other components. The SBR-based binder may contain 10% or more of an SBR-derived component, 30% or more of an SBR-derived component, 50% or more of an SBR-derived component, 70% or more of an SBR-derived component, or 90% or more of an SBR-derived component, for example, in mass fraction.

The SBR-based binder may be thermoplastic. The SBR-based binder may have a softening point that is suitable for hot pressing. The SBR-based binder may be liquefied by performing hot pressing on an electrode containing the SBR-based binder, and may be resolidified thereafter. It is expected that the electrode is densified as a result. It is expected that the battery properties (e.g. input/output properties etc.) are improved when the electrode is densified.

The compatibility among the various kinds of materials may be evaluated in accordance with a distance (Ra) in the Hansen space. The "Hansen space" is a three-dimensional space represented by Hansen solubility parameters (HSPs). It is considered that two materials are better compatible with each other as the distance (Ra) between the two materials is shorter in the Hansen space. The distance (Ra) between the sulfide SE and the imidazoline compound is shorter than the distance (Ra) between the sulfide SE and the SBR-based binder. When the dispersion promotion component contains both the imidazoline compound and the SBR-based binder, it is expected that the dispersion effect is enhanced by the imidazoline compound and the SBR-based binder acting synergistically, since the imidazoline compound may be preferentially adsorbed on the sulfide SE compared to the SBR-based binder.

For example, the distance between the sulfide SE and a fluorine-based binder (such as PVDF) tends to be short. When the imidazoline compound and the fluorine-based binder coexist, the fluorine-based binder may be preferentially adsorbed on the sulfide SE. As a result, a synergistic dispersion effect may not be obtained. However, any binder may be used as long as the dispersion effect of the dispersion promotion component is obtained. Examples of calculation of distances in the Hansen space are indicated below.

Distance (Ra) between sulfide SE and imidazoline compound=10.7 $MPa^{0.5}$

Distance (Ra) between sulfide SE and SBR-based binder=11.6 $MPa^{0.5}$

Distance (Ra) between sulfide SE and fluorine-based binder=3.8 $MPa^{0.5}$

The composition amount of the SBR-based binder may be determined as desired. For example, the composition amount of the SBR-based binder may be 0.1 to 5 parts by mass, or 1 to 3 parts by mass, with respect to 100 parts by mass of the active material.

Addition of Solvent

A solvent may be added to the second electrode material. It is expected that subsequent formation of slurry is facilitated by the interaction between the added solvent and the dispersion promotion component. For example, THN may be added to the second electrode material.

Storage

The present production method may include storing the second electrode material. The second electrode material may be stored indoors, for example. The storage temperature may be 25±10° C., for example. The relative humidity at the storage location may be 50% or less, for example. The storage period may be 1 day or more, 3 days or more, 7 days or more, 14 days or more, or 21 days or more, for example. The storage period may be 28 days or less or 21 days or less, for example. It is expected that the productivity is improved when there is a high degree of freedom in the storage period.

The second electrode material may be stored in a container. It is expected that the storage environment (e.g. ambient atmosphere) can be managed easily when the second electrode material is stored in a container. The storage container may be formed from a material that is not altered because of contact with the second electrode material. Examples of the alteration are considered to include dissolution, swelling, decomposition, etc. The storage container may contain at least one kind selected from the group consisting of a glass material, a metal material (e.g. aluminum, stainless steel, etc.), a resin material, and a carbon material (e.g. carbon fibers etc.), for example.

The storage container may be tightly closed. The second electrode material contains a liquid. Variations in composition due to volatilization of the liquid may be reduced when the storage container is tightly closed.

There may be a low dew point atmosphere in the storage container. The second electrode material may contain the sulfide SE. Degradation of the sulfide SE due to a water content may be reduced when there is a low dew point atmosphere in the storage container. The dew point in the storage container may be −30° C. or lower, −40° C. or lower, or −60° C. or lower, for example. It is expected that the sulfide SE is degraded to a lesser degree as the dew point is lower.

(c) Preparation of Slurry

The present production method includes preparing slurry containing the second electrode material. For example, slurry may be formed when a dispersion process is performed on the second electrode material. In the present production method, any dispersion device may be used. For example, an ultrasonic homogenizer etc. may be used. A solvent may be added in the dispersion process. The final solid content concentration may be 50% to 70%, 50% to 60%, or 60% to 70%, for example. An electron conducting material or an ion conducting material may be added in the dispersion process.

Electron Conducting Material

The electron conducting material may form an electron conducting path in the electrode. The composition amount of the electron conducting material may be determined as desired. The composition amount of the electron conducting material may be to 10 parts by mass, for example, with respect to 100 parts of the active material. The electron conducting material may contain any component. The electron conducting material may contain at least one kind selected from the group consisting of carbon black (CB), vapor-grown carbon fibers (VGCFs), carbon nanotubes (CNTs), and graphene flakes (GF), for example. CB may contain at least one kind selected from the group consisting of acetylene black (AB), ketjen black (registered trademark), and furnace black, for example.

Ion Conducting Material

The ion conducting material may form an ion conducting path in the electrode. The ion conducting material may be particulate. The ion conducting material may have a D50 of 0.01 μm to 1 μm, 0.01 μm to 0.95 μm, and 0.1 μm to 0.9 μm, for example. The composition amount of the ion conducting material may be determined as desired. The composition amount of the ion conducting material may be 1 to 200 parts by volume, 50 to 150 parts by volume, or 50 to 100 parts by volume, for example, with respect to 100 parts by volume of the active material. The ion conducting material may contain a sulfide SE, a fluoride SE, etc., for example. The sulfide Se and the fluoride SE contained in the ion conducting material may be a sulfide Se and a fluoride SE of the same kind as or of a different kind from the sulfide SE and the fluoride SE contained in the second electrode material.

(d) Production of Electrode

The present production method includes applying the slurry to the surface of a base material to produce an electrode. Any application device may be used in the present production method. For example, a die coater, a roll coater, etc. may be used.

The base material may be electrically conductive. The base material may function as a current collector. The base material may be in a sheet shape or a grid shape, for example. The base material may have a thickness of 5 to 50 μm, for example. The base material may include a metal foil, a metal mesh, a porous metal body, etc., for example. The base material may contain at least one kind selected from the group consisting of Al, Cu, Ni, Cr, Ti, and Fe, for example. The base material may include an Al foil, an Al alloy foil, an Ni foil, a Cu foil, a Cu alloy foil, a Ti foil, a stainless steel foil, etc., for example. A carbon layer may cover the surface of the metal foil. The carbon layer may contain a conductive carbon material (e.g. AB etc.), for example.

An active material layer is formed on the surface of the base material when the slurry is dried. Any drying device may be used in the present production method. For example, a hot plate, a hot-air dryer, an infrared dryer, etc. may be used.

Pressing may be performed on the electrode after the slurry is dried. For example, cold pressing may be performed, or hot pressing may be performed. In the present production method, any pressing device may be used. For example, a roll pressing device etc. may be used. When hot pressing is performed, the pressing temperature may be adjusted in accordance with the type of the binder, for example. The pressing temperature may be 80° C. to 180° C., for example. The thickness of the active material layer after the pressing may be 10 to 200 μm, for example. The density of the active material layer after the pressing may be 2 to 4 $g/cm^3$, for example.

(e) Production of Solid-State Battery

The present production method may include producing a solid-state battery including the electrode obtained as described above.

Figure 2:
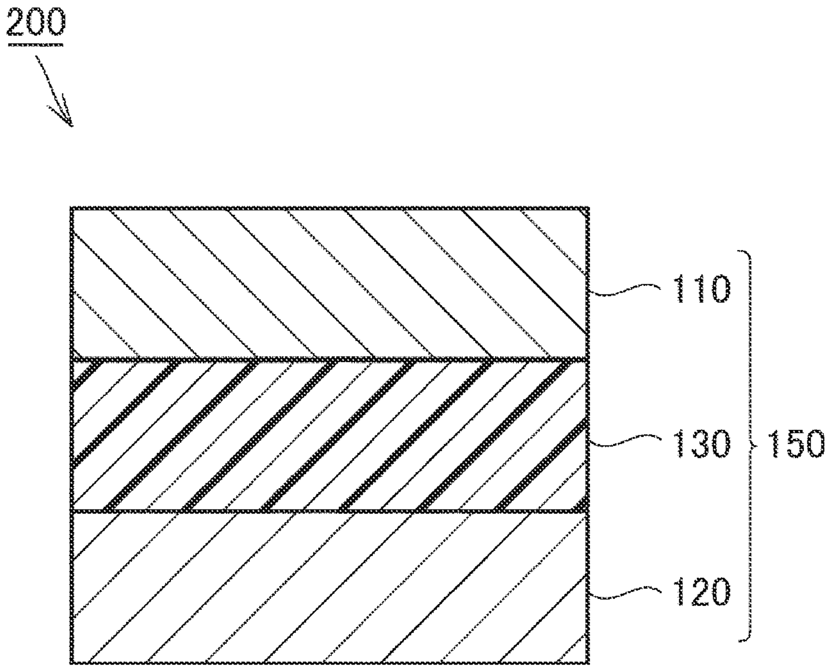
FIG. 2 is a conceptual diagram of a solid-state battery according to the present embodiment.

FIG. 2 is a conceptual diagram of a solid-state battery according to the present embodiment. For example, a power generation element 150 may be formed. The power generation element 150 may be formed by stacking a positive electrode 110, a separator layer 130, and a negative electrode 120. At least one of the positive electrode 110 and the negative electrode 120 is the electrode obtained as described above. The separator layer 130 is disposed between the positive electrode 110 and the negative electrode 120. The separator layer 130 includes an ion conducting material and a binder, for example. The separator layer 130 may be formed by applying the slurry to the surface of at least one of the positive electrode 110 and the negative electrode 120, for example.

Hot pressing may be performed on the power generation element 150 after the power generation element 150 is formed. It is expected that the power generation element 150 is densified through the hot pressing.

A lead tab, an external terminal, etc. may be connected to the power generation element 150, for example. The power generation element 150 is housed in an exterior body (not illustrated). The exterior body may be tightly sealed. A solid-state battery 200 may be completed when the power generation element 150 is housed in the exterior body.

The exterior body may have any form. The exterior body may be a pouch etc. made of a metal foil-laminated film, for example. The exterior body may be a case etc. made of metal, for example. The exterior body may contain Al etc, for example. The exterior body may house one power generation element 150 alone, or may house a plurality of power generation elements 150. The plurality of power generation elements 150 may form a series circuit, or may form a parallel circuit.

Fabrication of Samples

Samples No. 1 to 5 were prepared as described below.

No. 1

The following materials were prepared.

Active material: $LiNi_{0.8}Co_{0.15}Al_{0.05}O_2$

Fluoride SE: $Li_{2.7}Ti_{0.3}Al_{0.7}F_6$

Sulfide SE: $Li_3PS_4$

SBR-based binder

Imidazoline compound: 1-hydroxyethyl-2-alkenyl imidazoline ("DISPERBYK (registered trademark)-109" manufactured by BYK-Chemie)

Solvent: THN

"Nobilta NOB-MINI" manufactured by Hosokawa Micron Corporation was prepared. 48.7 parts by mass of the active material and 1.3 parts by mass of the fluoride SE were mixed in the device to form a buffer layer on the surface of the active material. The buffer layer contained the fluoride SE. The mixing condition was as follows.

Power: 12 W per 1 g of the material

Rotational speed: 6000 rpm

Processing time: 30 minutes

A dispersion process was performed on 98.4 parts by mass of the sulfide SE and 229.6 parts by mass of the solvent using an ultrasonic homogenizer. A dispersion liquid was prepared in this manner.

A glove box was prepared. The dew point in the glove box was controlled to −70° C. or lower. A planetary mixer was placed in the glove box. 1000 parts by mass of the active material (with the buffer layer) and the dispersion liquid obtained as described above were put into a mixing container of the planetary mixer. Hard-kneading was performed in the following procedure. The mixture was kneaded at a rotational speed of 70 for 10 minutes. 34 parts by mass of the solvent were additionally input, and the mixture was kneaded at a rotational speed of 100 for 10 minutes. 37 parts by mass of the solvent were additionally input, and the mixture was kneaded at a rotational speed of 100 for 10 minutes. Finally, the solvent was additionally input such that the solid content concentration was brought to 78.5%, and the mixture was kneaded at a rotational speed of 100 for 4 hours. A hard-kneaded material was formed in this manner.

The hard-kneaded material was transferred to a tightly closed container (made of stainless steel). Further, the solvent was added to the hard-kneaded material such that the solid content concentration was brought to 75%. The hard-kneaded material was liquefied by lightly stirring the hard-kneaded material. Further, the dispersion promotion component (SBR-based binder and imidazoline compound) was added to the hard-kneaded material. A sample was formed in this manner. The sample was stirred for 30 minutes.

No. 2

A sample was prepared in the same manner as with No. 1 except that the SBR-based binder was not added to the hard-kneaded material.

No. 3

A sample was prepared in the same manner as with No. 1 except that the imidazoline compound was not added to the hard-kneaded material.

No. 4

The hard-kneaded material of No. 1 was used as it was as a sample.

No. 5

A sample was prepared in the same manner as with No. 1 except that the SBR-based binder or the imidazoline compound was not added to the hard-kneaded material.

Evaluation 15 grams of the sample were stored for 14 days. The sample was stirred after being stored. A time taken before slurry was formed by stirring the sample was measured. The dispersion state was visually checked after the slurry was formed. In the following table 1, "P (pass)" in the "slurry dispersion state" indicates that the slurry was homogeneous. "F (fail)" indicates that the slurry was not homogeneous.

TABLE 1

| No. | Dispersion promotion component | Addition of THN before storage | Time taken to form slurry | Dispersion state of slurry |
|---|---|---|---|---|
| 1 | Imidazoline compound and SBR-based binder | Yes | 3 mins | P |
| 2 | Imidazoline compound | Yes | 3 mins | P |
| 3 | SBR-based binder | Yes | 3 mins | P |
| 4 | — | No | 10 mins | F |
| 5 | — | Yes | 15 mins | F |

It is seen in Table 1 above that there was a tendency that the time taken to form slurry was shortened and the dispersion state of the slurry was improved after storage when the sample contained the dispersion promotion component.

What is claimed is:

1. An electrode production method comprising:

(a) hard-kneading an active material, a solid electrolyte, and a solvent to prepare a first electrode material;

(b) adding a dispersion promotion component to the first electrode material to prepare a second electrode material;

(c) preparing slurry containing the second electrode material; and (d) producing an electrode by applying the slurry to a surface of a base material, wherein:

a composite body is formed by the solid electrolyte adhering to a surface of the active material in the (a); and the dispersion promotion component promotes dispersion of the solid electrolyte in the solvent, wherein the (b) includes storing the second electrode material.

2. The electrode production method according to claim 1, wherein:

the solid electrolyte contains a sulfide solid electrolyte; and the dispersion promotion component contains a styrene-butadiene rubber-based binder.

3. The electrode production method according to claim 1, wherein:

the solid electrolyte contains a sulfide solid electrolyte; and the dispersion promotion component contains an imidazoline compound.

4. The electrode production method according to claim 1, wherein:

the solid electrolyte contains a sulfide solid electrolyte; and the solvent contains tetralin.

5. A solid-state battery production method comprising (e) producing a solid-state battery including the electrode according to claim 1.

6. An electrode production method comprising:

(a) hard-kneading an active material, a solid electrolyte, and a solvent to prepare a first electrode material;

(b) adding a dispersion promotion component to the first electrode material to prepare a second electrode material;

(c) preparing slurry containing the second electrode material; and (d) producing an electrode by applying the slurry to a surface of a base material, wherein:

a composite body is formed by the solid electrolyte adhering to a surface of the active material in the (a); and the dispersion promotion component promotes dispersion of the solid electrolyte in the solvent, wherein the solid electrolyte contains a sulfide solid electrolyte; and wherein the dispersion promotion component contains a styrene-butadiene rubber-based binder.

7. A solid-state battery production method comprising (e) producing a solid-state battery including the electrode according to claim 6.

* * * * *